United States Patent [19]

Vlahogeorge

[11] Patent Number: 5,058,254

[45] **Date of Patent: * Oct. 22, 1991**

[54] BACKER-ROD INSTALLATION TOOL

[75] Inventor: John T. Vlahogeorge, Lafayette, Ind.

[73] Assignee: Control Tool Company, Inc., Lafayette, Ind.

[ * ] Notice: The portion of the term of this patent subsequent to Apr. 17, 2007 has been disclaimed.

[21] Appl. No.: 470,980

[22] Filed: Jan. 26, 1990

Related U.S. Application Data

[63] Continuation-in-part of Ser. No. 383,000, Jul. 20, 1989, Pat. No. 4,916,790.

[51] Int. Cl.[5] ............ B23P 19/02

[52] U.S. Cl. ............ 29/235

[58] Field of Search ............ 29/235, 451, 460; 52/741, 743, 744; 404/64, 65, 74, 87; 7/103

[56] References Cited

U.S. PATENT DOCUMENTS

| | | | |
|---|---|---|---|
| 2,761,199 | 9/1956 | Allen | 29/270 |
| 3,246,390 | 4/1966 | Brown | 404/87 |
| 3,395,627 | 8/1968 | Barton | 404/87 |
| 3,436,070 | 9/1969 | Utley et al. | 269/904 |
| 4,341,007 | 7/1982 | Kruszona | 404/87 |
| 4,528,736 | 7/1985 | Hope et al. | 29/235 |
| 4,578,851 | 4/1986 | Song | 29/235 |
| 4,738,562 | 9/1988 | Howsley | 404/87 |
| 4,765,771 | 8/1988 | Howsley | 404/87 |
| 4,888,874 | 12/1989 | Dixon | 269/904 |

*Primary Examiner*—Robert C. Watson

*Attorney, Agent, or Firm*—Woodard, Emhardt, Naughton, Moriarty & McNett

[57] ABSTRACT

A backer-rod installation tool for forcing a backer rod to a predetermined depth. A first rotatable wheel is rotatably mounted to a frame and is extendible into a building slot to contact a backer-rod. A pair of outer wheels are rotatably mounted on either side of the first wheel contacting the outer building surface and limiting the extension of the first wheel into the building slot. The outer wheels are adjustably mounted to the frame to adjustably control the extension of the first wheel. In an alternate embodiment, the outer wheels are replaced by a single outer wheel. In one embodiment, the wheels are mounted by means of rods having flat surfaces contacting fasteners limiting rotational movement of the rods relative to the frame of the tool.

17 Claims, 6 Drawing Sheets

BACKER-ROD INSTALLATION TOOL

CROSS-REFERENCE TO RELATED APPLICATION

This application is a continuation-in-part of my co-pending U.S. patent application Ser. No. 383,000, filed July 20, 1989, and now U.S. Pat. No. 4,916,790, and entitled BACKER-ROD INSTALLATION TOOL.

BACKGROUND OF THE INVENTION

1. Field of the Invention

This invention is in the field of tools used in constructing buildings, and more specifically those tools associated with the installation of backer-rods.

2. Description of the Prior Art

Commercial buildings have numerous lengthy joints between various surfaces. For example, slabs of marble are spaced apart by joints to allow for expansion and contraction. The joints must be sealed with caulking compound or other suitable material placed adjacent the exterior surface of the slabs. Backer rods, typically produced from polyethylene, are initially installed in the joint at a specified depth with the remaining portion of the joint from the backer-rod to the outside surface then being filled with caulking compound. Building specifications require the installation of the backer-rod at a predetermined depth depending upon the width of the joint.

The typical practice in installing a backer-rod is to initially force the backer-rod into the joint and to then further force the backer-rod to the predetermined depth by means of forcing a putty knife against the rod. Use of such a tool does not provide accurate depth control of the backer-rod since the putty knife does not provide any means for measuring the depth of the slot or joint once the rod is installed. Further, many commercial buildings have thousands and thousands of linear feet of joints requiring an inordinate amount of time for the installation of the backer-rod to the predetermined depth. I have therefore devised a tool which after a desired width of wheel is chosen and the desired depth is adjusted will force the backer rod to the predetermined depth. The tool is particularly advantageous in that it allows for the installation of the backer-rod to the predetermined depth at a much quicker and easier pace as compared to the prior technique. Likewise, my tool is particularly adjustable to facilitate the different widths of slots or joints. The tool is also adjustable to insert backer-rods to different depths.

SUMMARY OF THE INVENTION

One embodiment of the present invention is a tool for installing a sealant backer-rod to a desired depth in a joint between building surfaces comprising a frame for a worker to hold, a first contact device mounted to the frame and having a width sized to fit into the joint with an outer surface to contact a sealant backer-rod in the joint as the frame is moved along the joint, a backer-rod depth control device on the frame and adjacent the first contact device having a first contact surface spaced inwardly from the outer surface a distance equal to the desired depth of the backer-rod, the control device with the first contact surface operable to contact and move along one of the building surfaces limiting inward movement of the first contact device in the joint when the frame is forced toward and along the length of the joint forcing the backer-rod to the desired depth, and, an adjustment device on the frame operable to adjust the inward spacing between the first contact surface and the outer surface equal to the desired depth.

It is an object of the present invention to provide a tool for installing a sealant backer-rod to a desired depth in a joint between building surfaces.

A further object of the present invention is to provide a backer-rod installation tool which is adjustable for different widths and depths of joints.

A further object of the present invention is to provide a tool for installing a sealant backer-rod to a desired depth in in a quicker and easier pace as compared to the prior techniques.

Related objects and advantages of the present invention will be apparent from the following description.

DESCRIPTION OF THE PREFERRED EMBODIMENTS

Figure 1:
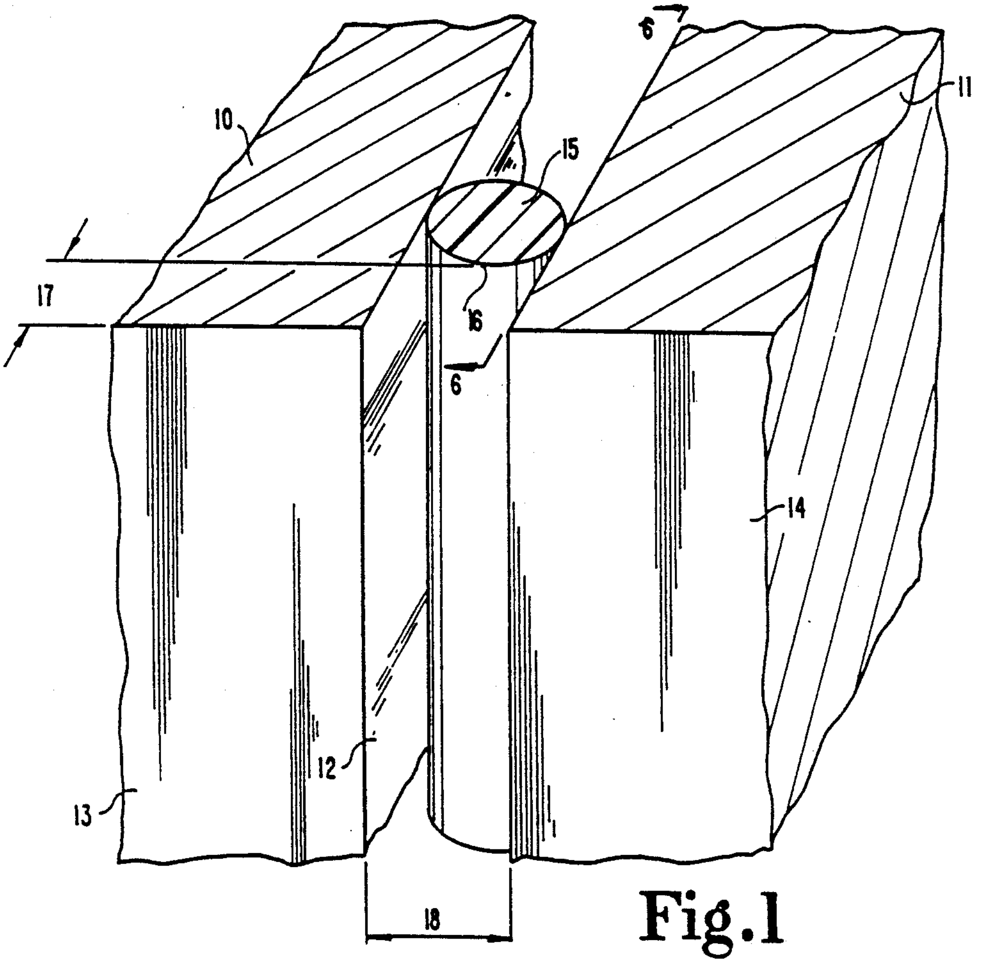
FIG. 1 is a fragmentary view of a sealant backer-rod installed in a joint between two slabs of building materials.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown two slabs 10 and 11 of construction material. The two slabs may, for example, be produced from marble and provide the exterior skin of a office building. Slabs 10 and 11 are spaced apart to provide a control joint for contraction and expansion of the materials. Thus, a joint 12 is provided between both slabs and opens outwardly through the front exterior surfaces 13 and 14, respectively of slabs 10 and 11. A conventional polyethylene, cylindrical backer-rod 15 is shown positioned in joint 12 and has a most forward located portion 16 located a distance 17 from the exterior surfaces 13 and 14. Typically, the depth 17 of backer-rod 15 should be one-half the width 18 of joint 12.

Figure 2:
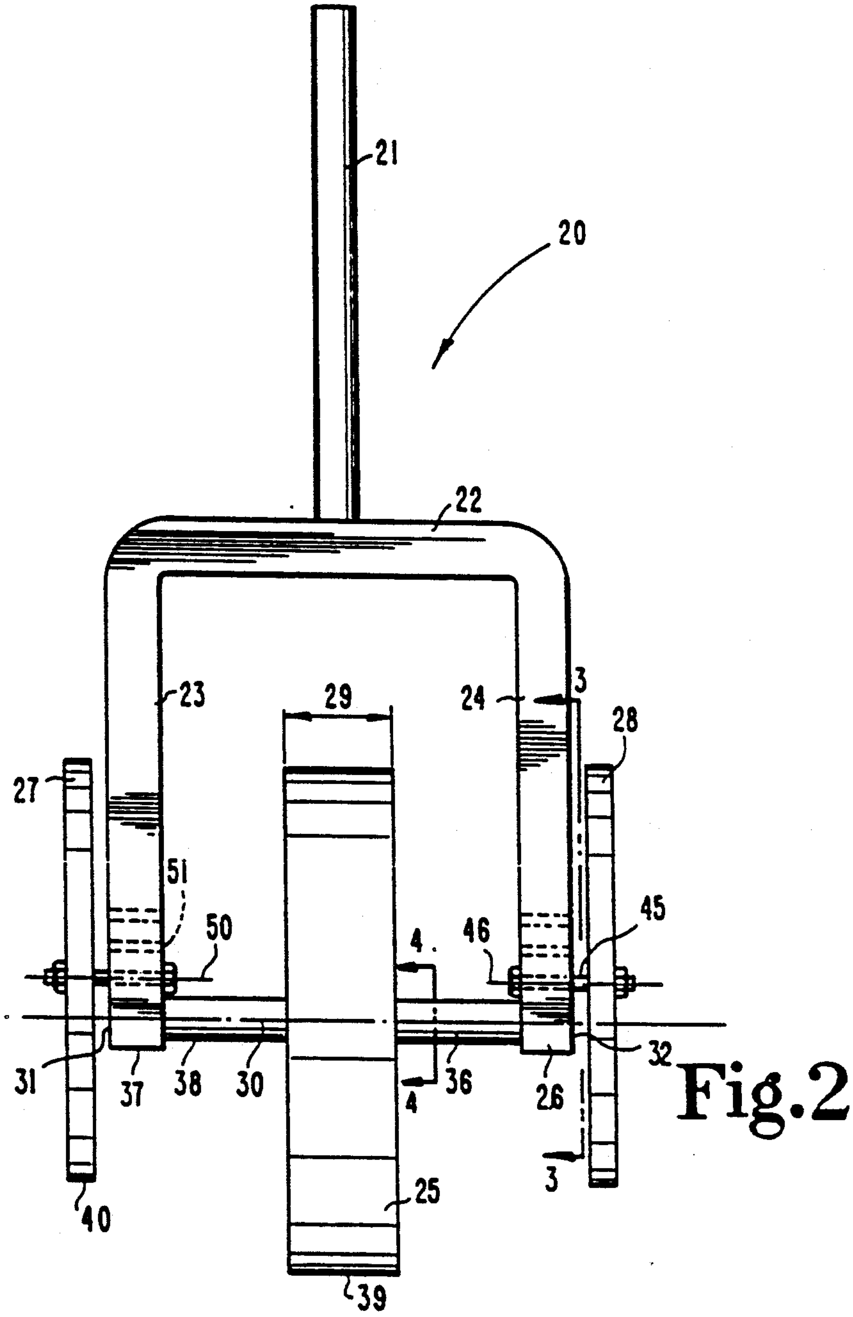
FIG. 2 is a plan view of the first alternate embodiment of the tool incorporating the present invention.

Once the backer-rod is forced into joint 12, the tool shown in FIG. 2 is used to further force the backer-rod into the joint so that distance 17 is set at a predetermined value such as one-half of the width of slot 18. Tool 20 includes a handle 21 fixedly mounted to a frame 22 having a depending pair of arms 23 and 24. A middle wheel 25 is rotatably mounted between the arms at the distal ends 37 and 26 of the arms. A pair of wheels 27 and 28 are mounted outwardly of and to arms 23 and 24, respectively. Wheels 27 and 28 ride on the exterior surfaces 13 and 14, whereas wheel 25 is positioned within joint 12 forcing the backer-rod to the predetermined and desired depth. The depth is controlled by the distance between the outer circumferential surface of wheel 25 and the outer circumferential surfaces of wheels 27 and 28. The structure shown in FIG. 2 for the tool is but one possible means for controlling the distance between the outer portion of the middle wheel 25 and the outer portion of wheels 27 and 28, it being understood that other structures may be similarly employed to practice my invention.

Figure 3:
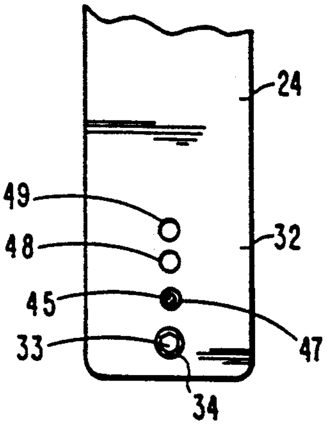
FIG. 3 is a cross-sectional view taken along the line 3—3 of FIG. 2 and viewed in the direction of the arrows.
Figure 4:
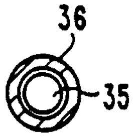
FIG. 4 is a cross-sectional view taken along the line 4—4 of FIG. 2 and viewed in the direction of the arrows.

The middle wheel 25 has a width 29 less than the width 18 of joint 12 to facilitate the insertion of the middle wheel into the joint. Wheel 25 is rotatably mounted to arms 23 and 24 about a first axis of rotation 30. Many means may be used to rotatably mount wheel 25. In the embodiment shown in FIGS. 2 and 3, a bolt 35 (FIG. 4) extends through both arms 23 and 24, and also through the center of wheel 25. The hexagonally shaped head 33 of bolt 35 is received in the counter-bored recess 34 of the outer surface 32 of arm 24 with the shank of the bolt then passing further through arm 24, through wheel 25 and then through a counter-bored hole opening through outer surface 31 of arm 23. A hexagonally shaped nut may be provided in the counter-bored hole contained at the distal end 37 of arm 23. A pair of sleeves 38 and 36 surround bolt 35 and are positioned, respectively, between wheel 25 and arm 23 and wheel 25 and arm 24. For example, sleeve 36 is shown surrounding bolt 35 being positioned between the mutually facing surfaces of wheel 25 and arm 24.

Figure 6:
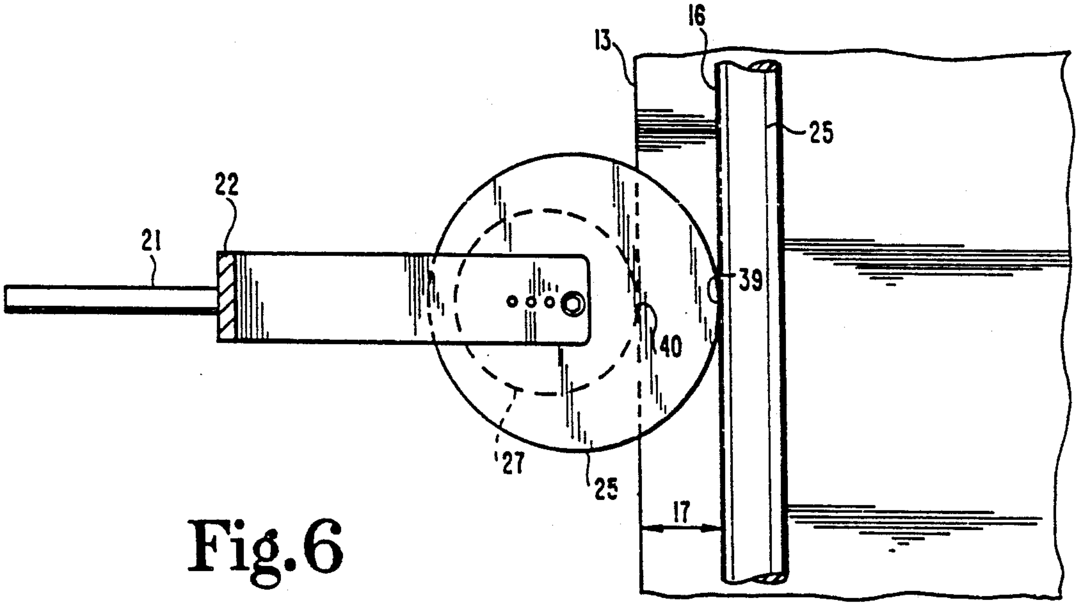
FIG. 6 is a cross-sectional view of the joint of FIG. 1 with the tool of FIG. 2 inserted in the joint.

Since the width of joint 12 will vary depending on the particular building application, bolt 35 may be quickly disassembled from arms 23 and 24 allowing for the removal of wheel 25 having width 29. A second wheel may then be installed onto the bolt 35 between arms 23 and 24 having a width different from width 29. In such a case, sleeves 36 and 38 must be changed to facilitate the greater or lesser width of the new wheel. For example, in the event the width of the wheel is increased, then the lengths of each sleeve 36 and 38 must be decreased. The purpose of sleeves 36 and 38 is to prevent the wheel from wobbling and to center the wheel between arms 23 and 24. Thus, if the width 29 of wheel 25 is decreased, then the lengths of each sleeve 36 and 38 are increased. The outer circumferential surface 39 of wheel 25 contacts and rolls along sealant rod 15 as the frame is moved the length of joint 12. Continued force and movement of the frame toward rod 15 will cause the middle wheel 25 to force the backer-rod deeper until wheels 27 and 28 engage surfaces 13 and 14 thereby preventing further movement of the backer-rod into the joint. Thus, referring to FIG. 6, the handle 21 fixed to frame 22 is shown as extending perpendicularly outward from surface 13 of slab 10 with the outer circumferential surface 39 of the middle wheel 25 contacting the most forward portion 16 of backer-rod 25 while the outer circumferential surface 40 of wheel 27 contacts surface 13 of slab 10. The depth 17 is equal to the distance between locations 39 and 40 in a direction perpendicular to the axis of rotation.

Wheels 27 and 28 may be remounted to relocate the axis of rotation of each wheel. In such a manner, the distance between the outer circumferential surface of the outer wheels may be changed relative to the outer circumferential surface of the middle wheel 25. Both wheels are rotatably mounted by means of a bolt or similar means. The mounting of wheel 28 will now be described, it being understood that a similar description applies to the mounting of wheel 27. Bolt 45 passes through arm 24 and through the center of wheel 28 allowing the wheel to rotate along axis of rotation 46. The head of the hexagonally shaped bolt may be positioned adjacent the surface of arm 24 facing wheel 25 with a hexagonally shaped nut then being placed outwardly of wheel 28 and threadedly fastened onto the distal end of bolt 45 securing the wheel to arm 24. A means must be used to position wheel 28 apart from arm 24 to prevent contact between wheel 28 and the arm as the wheel is rotated. For example, a sleeve may surround the shank of bolt 45 being positioned between arm 24 and wheel 28 in a manner similar to sleeve 36. Alternatively, a shoulder bolt may be used with the shoulder of the bolt contacting wheel 28 and forcing the wheel apart from arm 24. The shank of the bolt 35 (FIG. 3) is shown as passing through hole 47 of arm 24. Additional bolt holes 48 and 49 are spaced upwardly from hole 45 and are aligned vertically as viewed in FIG. 3 with holes 47 and 34. Thus, in the event the depth 17 of the backer-rod is to be increased, then bolt 45 is removed from hole 47 and installed in either hole 48 or hole 49. Similarly, the axis of rotation of wheel 27 is shifted from axis 50 to an axis of rotation which is the same as the axis of rotation for wheel 28. Thus, if bolt 45 is moved to the middle hole 48, then the bolt mounting wheel 27 is shifted to the middle hole 51.

Figure 5:
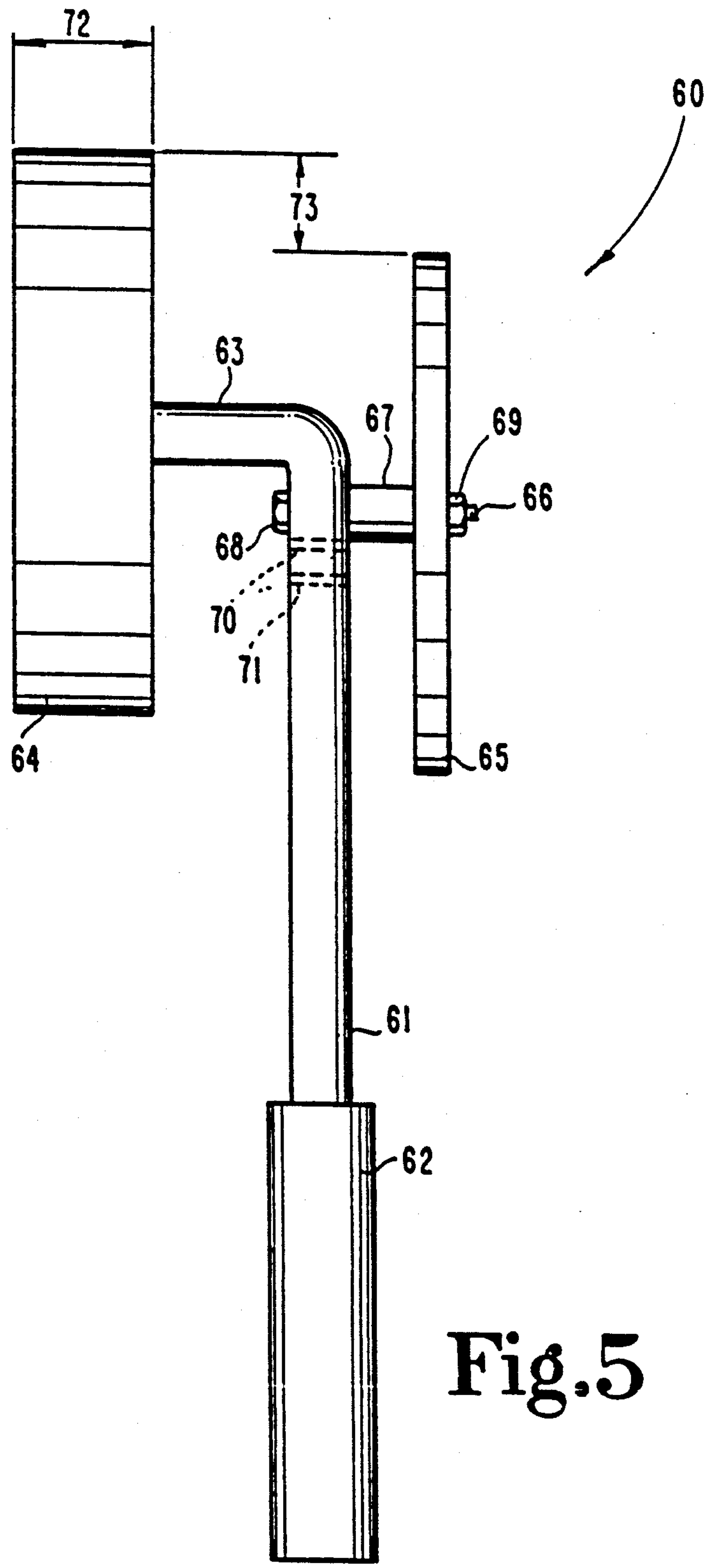
FIG. 5 is a plan view of a second alternate embodiment of the tool incorporating my new invention.

The tool shown in FIG. 2 for installing the backer-rod is designed for contacting both surfaces extending along the length of the slot. In many cases, the slot will extend along a corner, and thus all three wheels of the tool shown in FIG. 2 are unnecessary. Thus, the alternate embodiment of the tool is shown in FIG. 5 having only a single wheel for contacting the exterior surface of the slab of material extending the length of the joint. Tool 60 includes a main frame 61 with a handle 62 formed thereon for the worker to grasp and pull the tool along the length of the joint having the backer-rod inserted therein. The distal end 63 of frame 61 extends outwardly at a right angle to the main portion of frame 61 and has rotatably mounted thereon a wheel 64 corresponding to wheel 25 of tool 20. The width 72 of wheel 64 must therefore be less than the width of the slot into which wheel 64 is to be extended. Wheel 64 may be removed from distal end 63 and a different wheel having a greater or smaller width as compared to width 72 installed onto the frame. A variety of conventional means may be used to rotatably mount wheel 64 to distal end 63. For example, the end of distal end 63 may be reduced in diameter forming a shoulder resting against one side of wheel 64 with the reduced end of distal end 63 then extending freely through wheel 64 and being in meshing engagement, at the opposite side of the wheel, with the hexagonally shaped nut, or similar means, thereby securing the wheel onto the frame, and preventing the wheel from wobbling as the outer circumferential surface of the wheel is moved against the backer-rod forcing the backer-rod to the desired depth.

A second wheel 65, corresponding to either wheel 27 or wheel 28 is rotatably mounted to frame 61 by conventional means. For example, in the embodiment shown in FIG. 5, a bolt 66 extends through wheel 65, sleeve 67 and frame 61 with the head 68 of the bolt being positioned on the opposite side of frame 61 and with the hexagonally shaped nut 69 securing the wheel to the bolt. Sleeve 67 spaces wheel 65 apart from frame 61 preventing the wheel from contacting the frame as it is rotated and rolls against the outer surface 13 or 14 extending to one side of the joint. As in the case of the embodiment depicted in FIG. 2, tool 60 is provided with alternative mounting holes 70 and 71 allowing the axis of rotation and bolt 66 to be moved downwardly as viewed in FIG. 5 to increase the distance 73 between the outer circumferential surfaces of wheels 64 and 65 with the distance 73 corresponding to the desired depth of the backer-rod within the joint. Tool 60 is particularly useful in forcing the backer-rod to the desired depth along corners and in joints provided in a staircase.

Many variations in the present invention are contemplated and included herein. For example, the rotational axis 46 may be offset from rotational axis 50 (FIG. 2) so long as the distance 17 between wheels 25 and 27 is the same as distance 17 between wheels 25 and 28. Likewise, more than two wheels may be provided for contacting the exterior surface of the building. Alternatively, small skids or skis may be used in lieu of wheels 27, 28 and 65.

Figure 7:
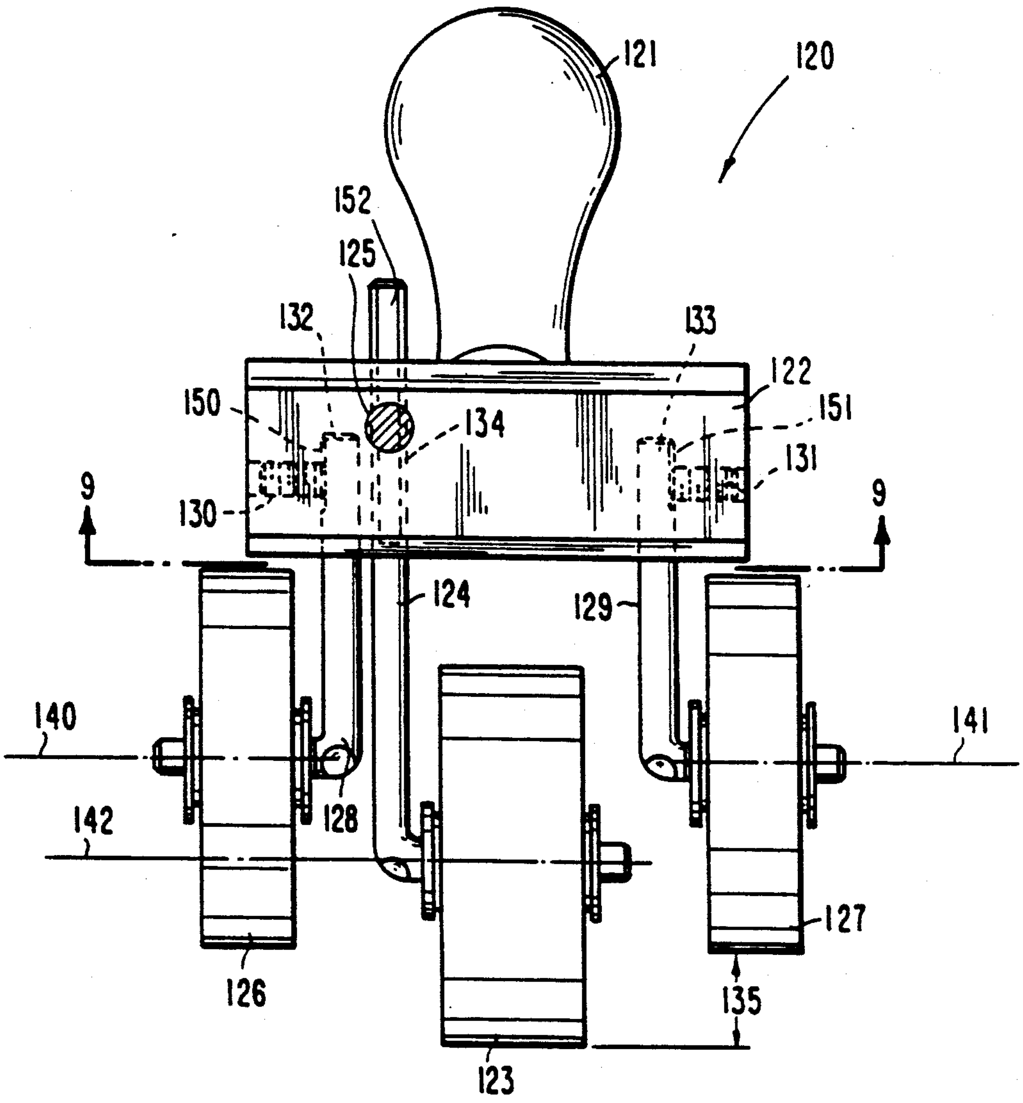
FIG. 7 is a plan view of the preferred embodiment of the tool incorporating the the present invention.
Figure 8:
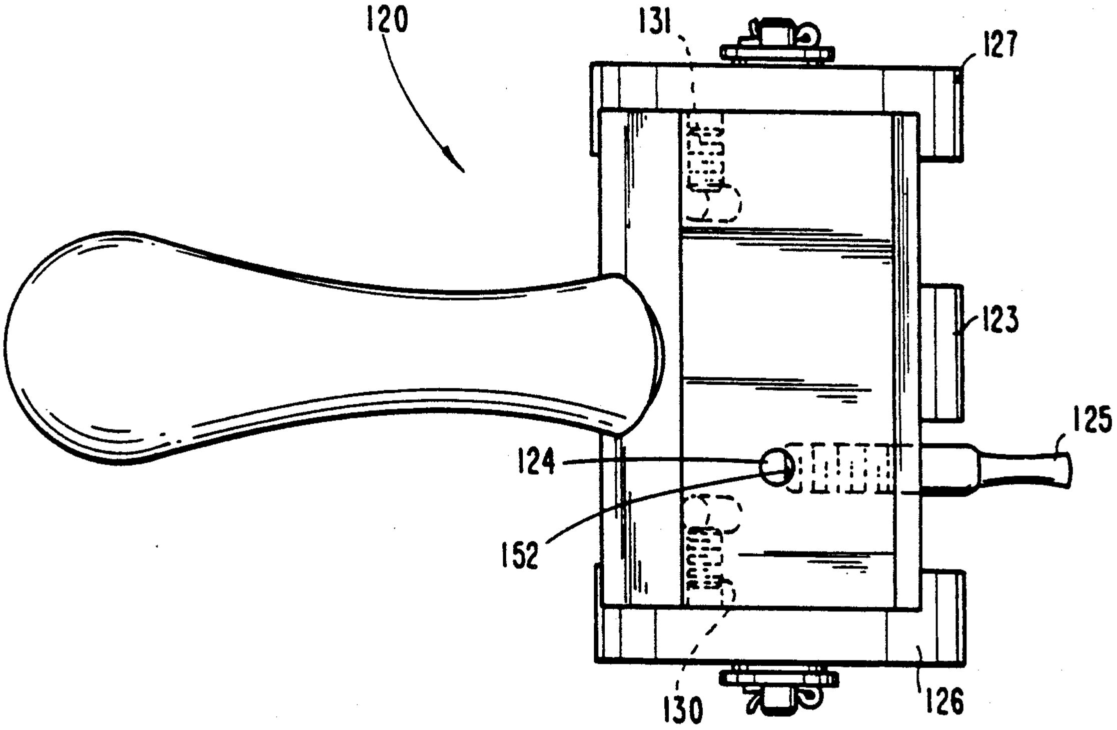
FIG. 8 is a top view of the tool of FIG. 7.

The preferred embodiment of the backer-rod installation tool is shown in FIGS. 7 and 8. Tool 120 includes a handle 121 fixedly mounted to a bar-shaped frame 122. A middle wheel 123 is rotatably mounted to a rod 124 in turn slidably mounted to frame 122 and held in place by means of a conventional fastener 125. A pair of outer wheels 126 and 127 are mounted, respectively, to a pair of rods 128 and 129, also slidably mounted to frame 122 and secured in place, respectively, by means of conventional fastening devices 130 and 131. Middle wheel 123 has a width sized to fit into the joint with the outer circumferential surface of the wheel contacting the sealant backer rod in the joint as the frame is moved along the joint. The outer wheels 126 and 127 provide a backer-rod depth control means on the frame which contacts the outwardly facing building surfaces extending on either side of the joint limiting the extension of the middle wheel into the joint.

The operation and use of the preferred embodiment of FIG. 7 is similar to the alternate embodiment shown in FIG. 2 with the exception of the manner or structure of mounting of the three wheels to the frame. The three rods 128, 124 and 129 provide an easy and quick method of adjusting the inward spacing of the circumferential surface of wheels 126 and 127 relative to the circumferential surface of the middle wheel 123.

Rod 128 has a main shank which extends slidably and releasably into a hole 132 provided in frame 122. Fastener 130 is threadedly mounted to the frame and extends into hole 132 releasably against the main shank of rod 128. The opposite end of the rod is bent at a right angle extending outwardly rotatably receiving wheel 126 which is secured thereto by conventional washers and a cotter pin. Likewise, the main shank of rod 129 extends releasably and slidably into a hole 133 provided in frame 122. Fastener 131 is threadedly mounted to the frame and extends into hole 133 releasably against the main shank of rod 129. The bottom distal end of the rod extends at a right angle to the main shank of the rod with the distal end extending outwardly rotatably receiving wheel 127. A pair of washers are located on the opposite sides of wheel 127 which is secured to the distal end of the rod by means of a cotter pin. The middle wheel is mounted in the same manner in that the main shank of rod 124 extends releasably and slidably through hole 134. A conventional fastening device 125 is threadedly mounted to the frame and extends into hole 134 and against the main shank of rod 124. The bottom end portion of rod 124 is perpendicularly arranged relative to the main shank of the rod and extends towards wheel 127 rotatably receiving middle wheel 123. A pair of washers are mounted to the distal end of rod 124 on the opposite sides of wheel 123 which is secured to the rod by means of a cotter pin. Rods 128, 124 and 129 have flat surfaces 150, 152, and 151, respectively, against which fasteners 130, 125 and 131 contact preventing rotational motion of the rods within the holes.

The means for controlling the depth of the backer-rod in the joint includes the two outer wheels 126 and 127 which each have circumferentially extending surfaces spaced inwardly from the circumferential surface of the middle wheel 123. The distance 135 between the outer circumferential surface of wheel 127 to the outer circumferential surface of wheel 123 is the same as the distance between the outer circumferential surface of wheel 126 and the outer circumferential surface of wheel 123. Likewise, distance 135 determines and is equal to the depth of the backer-rod forced into the joint.

The adjustment means on the frame to control or adjust distance 135 includes the three rods 128, 124 and 129 which may be moved relative to frame 122 once the fasteners 130, 131 and 125 are loosened. A variety of configurations are possible with the three rods in that rods 128 and 129 may remain stationary relative to frame 122, whereas fastener 125 may be loosened and rod 124 adjusted to achieve the desired distance 135. Alternatively, rod 124 may remain fixed relative to the frame, while rods 128 and 129 are adjusted to achieve the desired distance 135. In the unusual condition where the building surfaces extending on the opposite sides of the joint are not in the same plane, then the distance between the outer circumferential surfaces of wheels 127 and 123 may be different than the distance between the outer circumferential surfaces of wheel 126 and 123. In this latter instance, the axis of rotation 140 of wheel 126 would be parallel, but not aligned with the axis of rotation 141 of wheel 127. In any event, the axis of rotation 140 and 141 are parallel with axis of rotation 142 of wheel 123.

Figure 9:
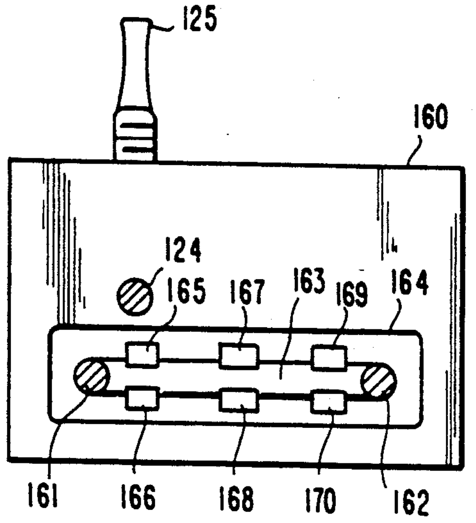
FIG. 9 is a cross-sectional view taken along the line 9—9 of FIG. 7 and viewed in the direction of the arrows only showing an alternate method of mounting the wheels to the main frame.

The tool 120 shown in FIG. 7 includes an alternate method or structure for mounting the two outer wheels 126 and 127 to frame 122. Instead of extending rods 128 and 129 into separate holes within frame 122, the top ends of rods 128 and 129 are integrally connected to an interconnecting rod 163 which extends perpendicularly to the top portions 161 and 162 of rods 128 and 129. Wheels 126 and 127 are mounted to the bottom ends of the rods as previously disclosed for tool 120 shown in FIG. 7. Likewise, wheel 123 is mounted by rod 124 to main frame 160 (FIG. 9) in a manner identical to that described and shown for tool 120 in FIG. 7. Thus, a fastener 125 extends into frame 160 abutting a flat surface on rod 124 preventing relative motion of rod 124 relative to frame 160. Main frame 160 includes a recess 164 with a plurality of spring fingers extending outwardly therefrom releasaably engaging interconnecting rod portion 163. Thus, a pair of spring fingers 165 and 166 having their proximal ends integrally joined to frame 160 extend outwardly therefrom with their distal ends spring biased apart to releasably hold interconnecting rod portion 163. Likewise, fingers 167 and 168 and fingers 169 and 170 have their proximal ends integrally joined to main frame 160 and extend outwardly thereon to releasably hold and engage connecting rod portion 163. As such, wheels 126 and 127 are located a fixed distance from frame 160 and thus the wheel mounted to rod 124 must be adjusted to and from main frame 160 depending on the depth of the slot.

Figure 10:
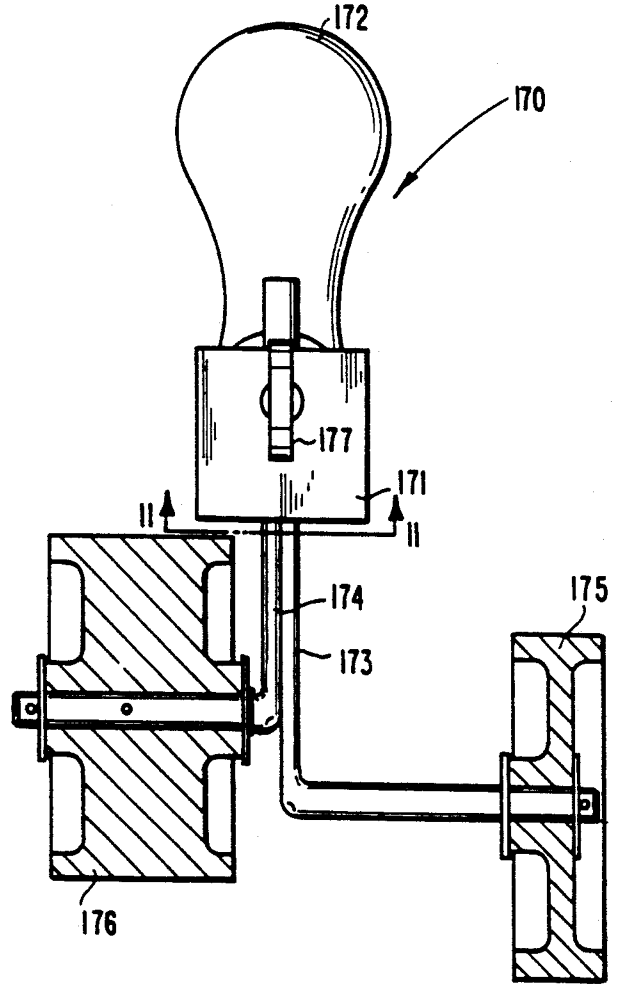
FIG. 10 is a fragmentary plan view of a third alternate embodiment of the tool incorporating my new invention.
Figure 11:
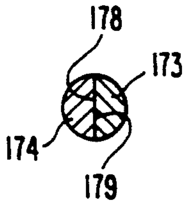
FIG. 11 is an enlarged cross-sectional view taken along the line 11—11 of FIG. 10 and viewed in the direction of the arrows.

A third alternate embodiment of the tool incorporating my new invention is disclosed in FIG. 10. Tool 170 is similar to tool 60 in that only a pair of wheels are rotatably mounted thereto; however, the rods mounting the wheels of tool 170 are slidably received in the main frame of the tool. Thus, tool 170 includes a main frame 171 with a handle 172 secured thereto. A pair of rods 173 and 174 extend into a single hole formed in frame 171 with wheels 175 and 176 rotatably mounted to the bottom or distal ends of rods 173 and 174, respectively. A fastener 177 is threadedly mounted to the main frame and has a distal end intersecting the hole into which rods 173 and 174 project. Thus, fastener 177 may be threadedly moved into engagement with rods 173 and 174 securing the positions of the wheels relatively to the main frame 171. Rods 173 and 174 have mutually opposed and contacting flat surfaces 178 and 179 preventing relative rotational motion between the rods.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A tool for installing a sealant backer-rod to a desired depth in a joint between building surfaces comprising:

a frame for a worker to hold;

first contact means mounted to said frame and having a width sized to fit into said joint with an outer surface to contact a sealant backer-rod in said joint as said frame is moved along said joint;

backer-rod depth control means on said frame and adjacent said first contact means having a first contact surface spaced inwardly from said outer surface a distance equal to the desired depth of said backer-rod, said control means with said first contact surface operable to contact and move along one of said building surfaces limiting inward movement of said first contact means in said joint when said frame is forced toward and along the length of said joint forcing said backer-rod to said desired depth; and, adjustment means on said frame operable to adjust the inward spacing between said first contact surface and said outer surface equal to said desired depth.

2. The tool of claim 1 and further comprising:

mounting means on said frame mounting said first contact means to said frame and operable to allow removal of said first contact means and mounting of another having a different width than said width of said first contact means.

3. The tool of claim 1 wherein:

said adjustment means includes a first rod slidably mounted to said frame and a fastener securing said rod to said frame, said adjustment means operable to allow said rod to slide with said backer rod depth control means thereon relative to said frame and change said inward spacing.

4. The tool of claim 3 wherein:

said adjustment means includes a second rod mounted to said frame with said second rod having a distal and with said first contact means thereon, said second rod releasably and slidably mounted to said frame to change said inward spacing.

5. The tool of claim 4 wherein:

said backer-rod depth control means includes a second contact surface located from said outer surface a distance equal to said inward spacing, said first contact means is located between said first contact surface and said second contact surface which contact both of said building surfaces as said first contact means forces said backer-rod to the desired depth in said joint.

6. The tool of claim 5 wherein:

said adjustment means includes a third rod slidably mounted to said frame, said adjustment means operable to allow said third rod to slide with said second contact surface thereon relative to said frame and change said inward spacing of said second contact surface relative to said outer surface, said first rod, said second rod and said third rod have flat surfaces thereon to limit relative motion with said frame.

7. A tool for installing a sealant backer-rod to a desired depth in a joint between building surfaces comprising:

a frame;

first means mounted to said frame and having an outer edge portion contactable against said backer-rod to force said backer-rod to a desired depth in a joint between building surfaces;

a first stop surface provided on said frame spaced apart from said outer edge portion a distance equal to the desired depth of said backer-rod; and, adjustment means operable to adjust said distance between said first stop surface and said outer edge portion equal to said desired depth.

8. The tool of claim 7 and further comprising:

second means movably mounted to said frame and having said stop surface located circumferentially thereon.

9. The tool of claim 7 and further comprising:

a second stop surface provided on said frame spaced apart from said outer edge portion a distance equal to the desired depth of said backer-rod.

10. The tool of claim 9 and further comprising:

third means mounted to said frame and having said second stop surface located circumferentially thereon.

11. The tool of claim 9 wherein:

said adjustment means includes a first rod, a second rod and a third rod releasably and slidably mounted to said frame and having respectively mounted thereon said first stop surface, said second stop surface and said outer edge portion mounted thereon.

12. A tool for installing a rod to a desired depth in a joint between building surfaces comprising:

a frame for holding in the hand;

a rod contact surface extending in the direction of a first axis, said rod contact surface provided on said frame and contactable against said rod to force said rod to a desired depth in a joint between building surfaces;

a first stop surface contactable against at least one of said building surfaces and provided on said frame being spaced apart from said rod contact surface a distance perpendicular to said axis equal to the desired depth of said rod; and, adjustment means operable to adjust said distance between said first stop surface and said rod contact surface equal to said desired depth and further operable to adjust spacing of said rod contact surface and said first stop surface relative to said frame 13. The tool of claim 12 and further comprising:

a second stop surface spaced equally from said rod contact surface as said first stop surface; and, wherein:

said adjustment means is further operable to adjust spacing of said second stop surface from said frame.

14. The tool of claim 13 and further comprising:

a joint wheel rotatably mounted to said frame; and, a pair of wheels rotatably mounted to said frame and having respectively said first stop surface and said second stop surface thereon with said pair of wheels being rotatably mounted to said frame about a second axis parallel to said first axis, said pair of wheels rolling along said building surfaces and said joint wheel rolling along said rod as said frame is forced toward and along said joint.

15. The tool of claim 14 wherein:

said adjustment means includes three rods releasably mounted to said frame and having distal ends respectively rotatably mounting said joint wheel and said pair of wheels to said frame.

16. The tool of claim 14 wherein:

said adjustment means includes a pair of rods integrally joined together and mounted to said frame and having distal ends mounting said pair of wheels to said frame.

17. The tool of claim 12 and further comprising:

a joint wheel rotatably mounted to said frame and having said rod contact surface thereon; and, an outer wheel rotatably mounted to said frame, and having said first stop surface thereon, said adjustment means includes two rods mounted to said frame and having distal ends respectively rotatably mounting said joint wheel and said outer wheel to said frame, said two rods have flat surfaces thereon to limit relative motion with said frame.

* * * * *